United States Patent [19]

Tamura

[11] Patent Number: 4,877,118
[45] Date of Patent: * Oct. 31, 1989

[54] SLIP DETECTING DEVICE FOR APPARATUS DRIVEN BY A PRIME MOVER

[75] Inventor: Yasuji Tamura, Ojima, Japan

[73] Assignee: Sanden Corporation, Gunma, Japan

[*] Notice: The portion of the term of this patent subsequent to Sep. 29, 2004 has been disclaimed.

[21] Appl. No.: 122,635

[22] Filed: Nov. 12, 1987

Related U.S. Application Data

[63] Continuation of Ser. No. 732,289, May 9, 1985, abandoned.

[30] Foreign Application Priority Data

May 9, 1984 [JP] Japan .................................. 59-91043

[51] Int. Cl.⁴ ........................ F16D 27/16; F16D 43/00
[52] U.S. Cl. .................................. 192/103 R; 192/150
[58] Field of Search ........................ 361/242; 324/174; 192/0.03, 0.032, 0.033, 0.076, 103 R, 104 R, 3.56, 150; 290/45

[56] References Cited

U.S. PATENT DOCUMENTS

| | | |
|---|---|---|
| 3,117,264 | 1/1964 | Smith . |
| 3,560,759 | 2/1971 | Buehler et al. . |
| 3,581,561 | 6/1971 | Tomashek ........................ 324/174 X |
| 3,584,715 | 6/1971 | Miller ................... 192/150 |
| 3,657,601 | 4/1972 | Darrow . |
| 3,710,246 | 1/1973 | Herring ........................... 324/174 X |
| 3,714,509 | 1/1973 | Coleman et al. ..................... 361/242 |
| 3,832,635 | 8/1974 | Cass .................... 324/174 X |
| 4,007,492 | 2/1977 | Rose ................................ 361/242 |
| 4,040,508 | 8/1977 | Sunada et al. .............. 192/104 R X |
| 4,127,812 | 11/1978 | Baliguet ............................... 324/174 |
| 4,393,966 | 7/1983 | Kono et al. ......................... 192/150 |
| 4,434,881 | 3/1984 | Denk et al. ........................ 192/0.03 |
| 4,462,491 | 7/1984 | Kono et al. ......................... 192/150 |
| 4,478,320 | 10/1984 | Baba ................................... 192/150 |
| 4,551,715 | 11/1985 | Durbin ............................ 324/174 X |
| 4,598,806 | 7/1986 | Sakakiyama .................... 192/3.56 X |
| 4,605,112 | 8/1986 | Takano ......................... 192/3.56 X |
| 4,697,091 | 9/1987 | Tamura ................................ 290/45 |

Primary Examiner—Rodney H. Bonck
Attorney, Agent, or Firm—Banner, Birch McKie & Beckett

[57] ABSTRACT

A device for detecting when a driven apparatus has frozen and/or its prime mover coupling mechanism is slipping. The rotational speed of the driven apparatus is detected and a corresponding speed signal is compared to a reference speed signal. The reference speed signal corresponds to a speed slightly lower than the idling speed of the prime mover. When the detected speed signal is lower than the reference speed single, slippage in the prime mover coupling mechanism is presumed and a slippage signal is provided. The slippage signal may be used to control the coupling mechanism to disengage the apparatus from the prime mover to prevent damage from occurring.

15 Claims, 4 Drawing Sheets

SLIP DETECTING DEVICE FOR APPARATUS DRIVEN BY A PRIME MOVER

This application is a continuation of application Ser. No. 732,289 filed May 9, 1985, now abandoned.

TECHNICAL FIELD

The present invention relates to the field of prime movers and apparatus which are driven by prime movers. More particularly, the invention is directed to a device for detecting when a driven apparatus has frozen and/or its prime mover coupling mechanism is slipping.

BACKGROUND OF THE INVENTION

Much of the machinery which has been developed over the years is driven by some form of prime mover. Thus efficient power transfer mechanisms are necessary for coupling the prime mover to the driven apparatus. Such power transfer mechanisms range from a simple pair of pulleys and a drive belt to rather complex gearing arrangements. Regardless of the design of the power transfer mechanism, slippage due to a frozen or sluggish driven apparatus usually results in damage to the power transfer mechanism and to the prime mover.

One examle of an apparatus which must be coupled to a prime mover is the compressor used in automotive air conditioning systems. Such compressors are usually coupled to the automobile engine by a drive belt through an electromagnetic clutch. If the compressor should freeze (lock) or become difficult to turn while the clutch is engaged, the belt will slip. Slippage causes rapid wear and early breakage of the belt. In some situations, unexpected breakage of a drive belt could have serious results. For example, FIGS. 1 and 2 illustrate the engine of an automobile where engine crank shaft 1 is used to drive belt 2. Belt 2 in turn drives power steering 3, compressor 4 for the air conditioning system, an idler wheel 5, alternator 6, air pump 7 and cooling fan pulley 8. If anyone of these driven apparatus becomes frozen or difficult to turn, belt 2 would slip and be prematurely worn. If the belt breaks, each of the systems operated by the belt would be rendered inoperative. Such a failure, e.g., in power steering 3, could lead to catastrophic consequences for those occupying the automobile. Thus, there is a need for detecting belt slippage so that appropriate measures can be taken to prevent subsequent breakage of the belt.

There are systems known in the prior art which detect the rate of rotational speed of a prime mover and a driven apparatus for the purpose of determining whether there is slippage in the power transfer mechanism. When slippage beyond a set amount is detected, the prime mover is shut down or the driven apparatus is disconnected from the prime mover. Because such devices must measure the rotational speed of both the prime mover and the driven apparatus and then calculate the rate of rotational speed for each, they are rather complicated in construction and quite expensive to manufacture.

SUMMARY OF THE INVENTION

It is therefore the overall object of the present invention to provide a device for detecting slippage in the power transfer mechanism of a prime mover and driven apparatus which is simple in construction and economical to manufacture.

It is another object of the present invention to provide such a device which detects slippage without detecting the rotational speed of the prime mover.

It is a further object of the present invention to provide such a device which is easy to adjust and which is highly reliable in operation.

These and other objects are achieved in accordance with the present invention by a device which includes a rotational speed detector for the driven apparatus and a speed comparator coupled to the speed detector and a reference speed source for controlling engagement of the power transfer mechanism. The speed detector sends a voltage signal to the speed comparator which varies in accordance with the rotational speed of the driven apparatus. A reference speed voltage signal is also provided to the speed comparator. The reference speed voltage signal corresponds to a speed which is selected to be lower than the idling speed of the prime mover. The speed comparator compares the voltage signal from the speed detector to the reference speed voltage signal. If the voltage signal from the speed detector in lower than the reference speed voltage signal, the speed comparator provides an output signal indicating that the rotational speed of the driven apparatus is less than the idling speed of the prime mover. Such a signal indicates that there is slippage in the power transfer mechanism between the prime mover and the driven apparatus. The slippage signal can then be used to disengage the driven apparatus from the prime mover.

In another embodiment of the invention, the rotational speed of the driven apparatus is compared to a second speed reference signal which corresponds to the maximum speed of the driven apparatus. When this speed is detected, the driven apparatus may also be disengaged from the prime mover.

DETAILED DESCRIPTION OF THE PREFERRED EMBODIMENTS

Figure 1:
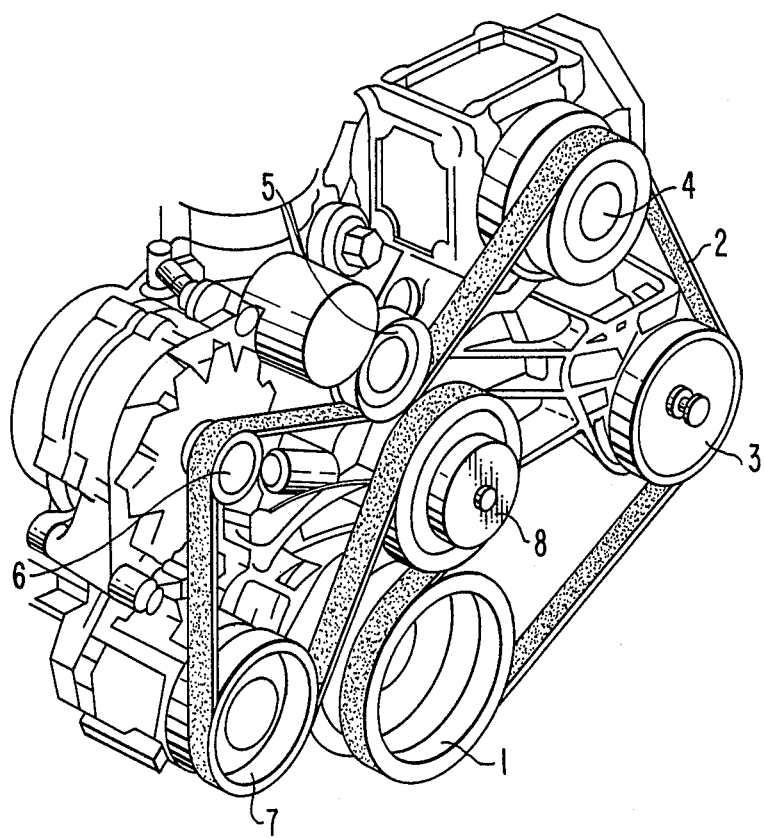
FIG. 1 is a perspective view of an automobile engine illustrating the various apparatus which are driven by a common belt.
Figure 2:
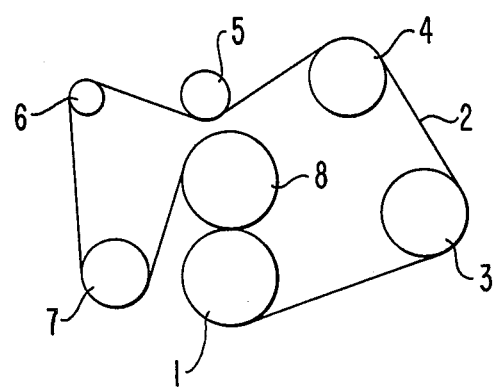
FIG. 2 is a schematic diagram of the belt drive system shown in FIG. 1.
Figure 3:
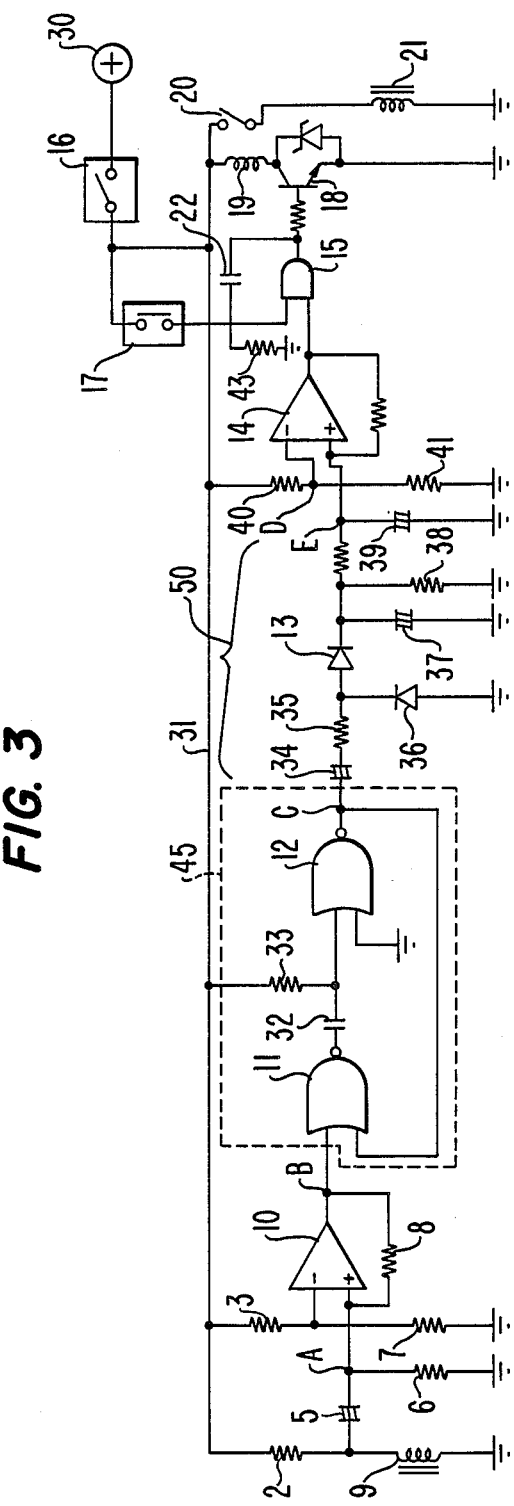
FIG. 3 is a circuit diagram illustrating one embodiment of the slip detecting device of the present invention.

FIG. 3 is a schematic diagram of one embodiment of a slip detecting device in accordance with the present invention. The device comprises transducer 9 which is mounted adjacent a rotating portion of the driven apparatus, such as the drive shaft of a compressor for an air conditioning system. In the following discussion, a compressor will be used to illustrate the present invention, though it should be understood that the invention has application in virtually every instance where an apparatus is driven by a prime mover. As shown in FIG. 3, transducer 9 is a magnetic pick-up device such as disclosed in Japanese Patent Publication No. 59-32673. A voltage pulse is induced in transducer 9 each time a magnetic portion of the compressor drive shaft rotates past the transducer. The magnetic portion can comprise one or more permanent magnets attached around the circumference of the drive shaft at equal intervals. Each magnet induces a voltage pulse in transducer 9 as the shaft rotates. The time period T between each pulse is proportional to the rotational speed of the drive shaft.

The voltage pulses from transducer 9 are coupled to the non-inverting (+) input terminal of comparator 10 through a coupling network made up of capacitor 5 and resistor 6. The inverting (−) input terminal of comparator 10 is provided with a reference voltage from the voltage divider network comprising resistors 3 and 7. Voltage for the voltage divider network is supplied by power supply 30 through switch 16 to power line 31. Resistor 2 is also connected to power line 31 and biases transducer 9 to the proper voltage level for comparator 10.

Figure 4A:
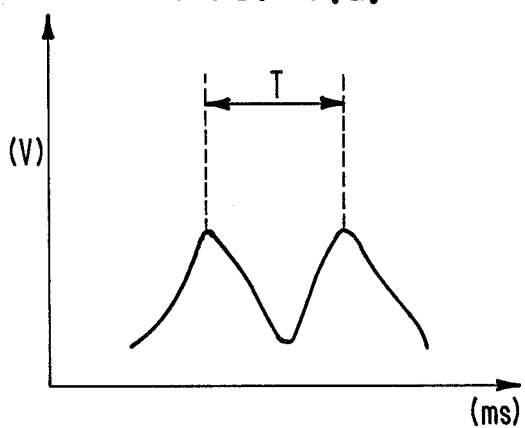
FIG. 4(a) is a graphical illustration of the voltage signal at point A in FIG. 3.
Figure 4B:
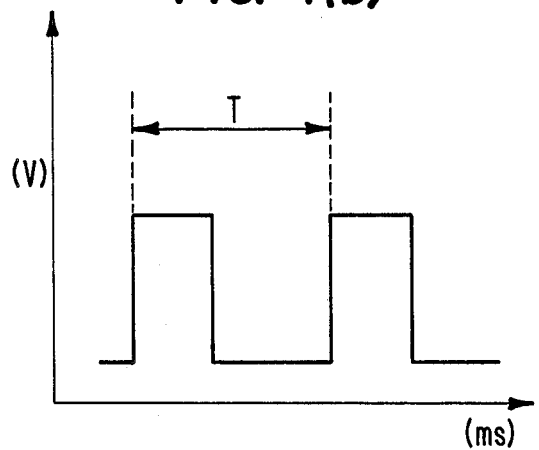
FIG. 4(b) is a graphical illustration of the voltage signal at FIG. 4(c) is a graphic illustration the voltage signal at point C in FIG. 3.

Comparator 10 is an operational amplifier with resistor 8 connected in a feed-back path between the output of the amplifier and the non-inverting input terminal of the amplifier. In the present invention, comparator 10 is used as a waveform-shaper which converts the analogue output voltage pulses from transducer 9 to corresponding logic signals as shown in FIGS. 4(a) and 4(b). FIG. 4(a) is a graphical representation of the voltage pulses from transducer 9 which appear at point A in FIG. 3, wherein period T between each pulse is proportional to the rotational speed of the compressor drive shaft. The corresponding logic signals at the output of comparator 10 (point B) are shown in FIG. 4(b), wherein time T between each pulse is the same as time T shown in FIG. 4(a). The output of comparator 10 is coupled to multi-vibrator circuit 45. Multi-vibrator 45 comprises NOR gates 11 and 12. The output of comparator 10 is coupled to one input of Nor gate 11. The output of NOR gate 11 is in turn connected to an input of NOR gate 12 through a coupling network made up of capacitor 32 and resistor 33. The second input of Nor gate 12 is connected to ground or the zero voltage reference potential. The output of Nor gate 12 (i.e., the output of multi-vibrator 45 at point C is connected in a feed-back path to the second input of Nor gate 11.

Figure 4C:
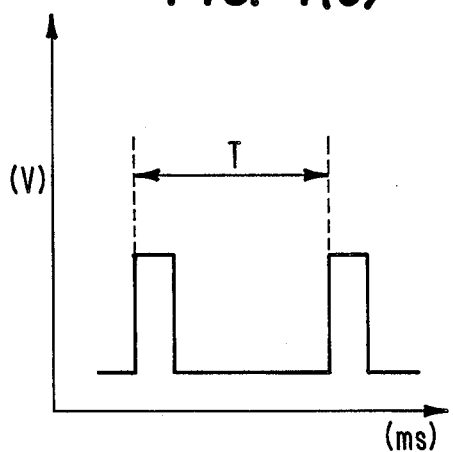
FIG. 4(d) is a graphical illustration of the relationship between the voltage signals at points D and E in FIG. 3.
Figure 4D:
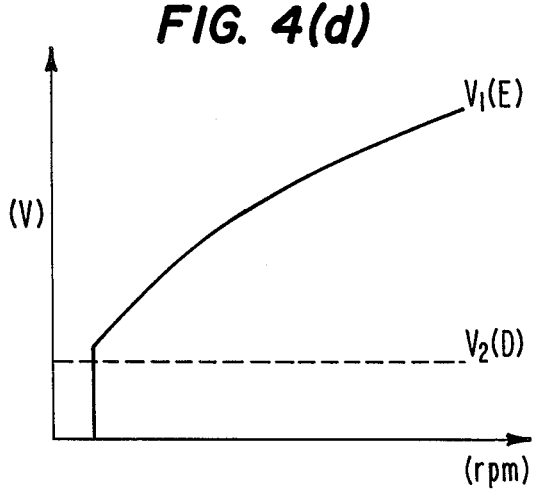

Multi-vibrator 45 provides additional waveform-shaping by converting the pulse width of the output signals from comparator 10 to a standard pulse width as shown in FIG. 4(c) while maintaining period T between each pulse. The output signals from multi-vibration 45 are filtered by filter circuit 50 comprising capacitor 34, resistor 35, diode 36, diode 13, capacitor 37, resistor 38, resistor 42 and capacitor 39. The output voltage of the filter circuit varies in accordance with period T. Since period T is proportional to the rotational speed of the drive shaft, the output voltage of the filter circuit is also proportional to the rotational speed of the drive shaft. When period T is short (rotational speed of the drive shaft is high), the output voltage of the filter circuit is high. On the other hand, when period T is long (the rotational speed of the drive shaft is low) the output voltage of the filter circuit is low. Thus, the value of the voltage at point E shown in FIG. 3 continuously varies dependent upon the rotational speed of the drive shaft, as shown in FIG. 4(d).

The output terminal of the filter circuit is connected to the non-inverting (+) terminal of comparator 14. The inverting terminal (−) of comparator 14 is connected to a reference voltage provided by a voltage divider made up of resistor 40 and 41. The voltage for the voltage divider is supplied by power supply 30 through switch 16 to power line 31. The voltage from the voltage divider is adjusted by using appropriate value for resistors 40 and 41 to provide a voltage at the inverting input terminal of comparator 14 which is slightly lower than the voltage at point E shown in FIG. 3 when the prime mover (as for example an automobile engine) which drives the compressor drive shaft is idling and there is no slippage condition in the power transfer mechanism. The voltage supplied from the voltage divider network to the inverting terminal of comparator 14 is hereafter referred to as $V_2$ while the voltage from point E shown in FIG. 3 and which is supplied to the non-inverting input terminal of comparator 14 is hereafter referred to as $V_1$. When $V_1$ is higher than $V_2$, the output voltage level of comparator 14 is high. The output terminal of comparator 14 is connected to one input of AND gate 15. The other input terminal to AND gate 15 is connected to power supply 30 through switch 16 and thermostat switch contacts 17. The output of AND gate 15 is connected to the base electrode of transistor 18. The emitter electrode of transistor 18 is connected to ground or the zero reference potential.

In the case where $V_1$ is higher than $V_2$, comparator 14 provides a logic H1 to an input terminal of AND gate 15. When switch 16 is turned on and thermostat switch contacts 17 are closed, the other input terminal to AND gate 15 is also at a logic HI. Thus, the output of AND gate 15 is a logic HI which causes transistor 18 to turn on. Thus, current flows from power supply 30 through relay coil 19, causing relay contact 20 to close. Relay contacts 20 control the operation of electromagnetic clutch 21. As a result, the automobile engine is coupled to the compressor through electromagnetic clutch 21.

In the case where $V_1$ is less than $V_2$, the output of comparator 14 is a logic LO. Thus, regardless of the close of switch 16 or thermostat contact 17, the output of AND gate 15 will remain a logic LO. Therefore, transistor 18 will be cut off and relay contacts 20 will remain open. Therefore, the automobile engine will not be coupled to the compressor because electromagnetic clutch 21 has not been energized.

Thus, in the present invention, where the rotational speed of the compressor drive shaft is less than the idling speed of the engine, a slipping condition is presumed and the electromagnetic clutch is deenergized so that the engine is disconnected from the drive shaft of the compressor.

In order to permit the compressor to be initially rotated when switch 16 is closed, capacitor 22 is provided. Capacitor 22 is connected between the output terminal of AND gate 15 and the input terminal of AND gate 15 and to thermostat contacts 17. When compressor switch 16 is closed, indicating that the automobile driver desires to operate the air conditioning system, no voltage pulses are produced by transducer 9 because the drive shaft of the compressor is not rotating. Capacitor 22, however, has the effect of providing a switching signal to transistor 18 in order to cause it to conduct, thereby causing relay contacts 20 to close and energize electromagnetic clutch 21.

Figure 5:
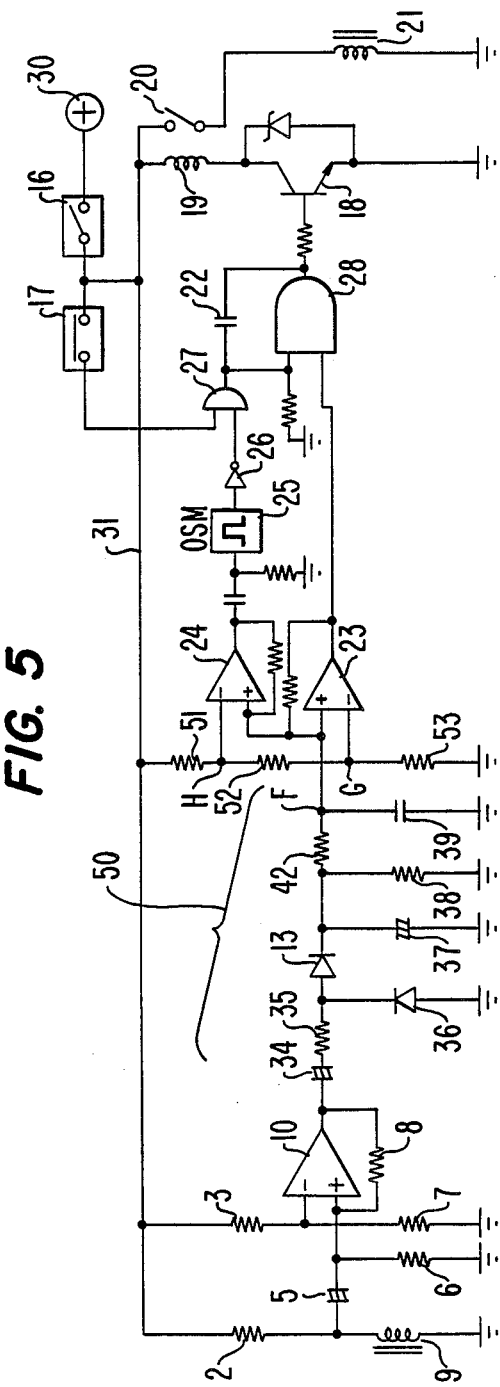
FIG. 5 is a circuit diagram illustrating another embodiment of the slip detecting device of the present invention.

With reference to FIG. 5, a further embodiment of the present invention is disclosed. In this embodiment, transducer 9, comparator 10 and filter circuit 50 are the same as described above with respect to FIG. 3. However, the output of comparator 10 is coupled directly to filter circuit 50 to provide an analog voltage at point F ($V_3$) which is proportional to the rotational speed of the compressor drive shaft.

The voltage signal appearing at point F is coupled to the non-inverting input terminal of comparators 23 and 24. The non-inverting input terminals of comparators 23 and 24 are provided with a reference voltage from a voltage divider made up of resistors 51, 52 and 53. The reference voltage at the inverting terminal of comparator 23 is selected to be slightly lower than the value of the voltage signal at point F while the prime mover (i.e., the engine of an automobile) is idling under the condition where there is no slippage in the power transfer mechanism. This voltage is referred to hereinafter as $V_4$. The inverting input terminal of comparator 24 is provided with a reference voltage selected to correspond with a rotational speed equal to the maximum RPM of the compressor. This voltage is referred to hereinafter as $V_5$. Thus, when the voltage signal from the output of filter circuit 50 ($V_3$) is higher than reference voltage $V_4$, comparator 23 provides a logic HI signal. When the voltage signal appearing at point F is higher than reference signal $V_5$, comparator 24 also outputs a logic high signal.

The output terminal of comparator 24 is coupled to an input terminal of AND circuit 27 through multivibrator 25 and invertor 26. The input terminal of AND circuit 27 is coupled to switch 16 through air conditioner thermostat 17. The output terminal of AND circuit 27 is connected to an input terminal of AND circuit 28. The output terminal of voltage comaprator 23 is connected to the other input terminal of AND circuit 28. The output terminal of AND circuit 27 is also coupled to the output terminal of AND circuit 28 through capacitor 2. The output terminal of AND circuit 28 is connected to the base of switching transistor 18.

Figure 6:
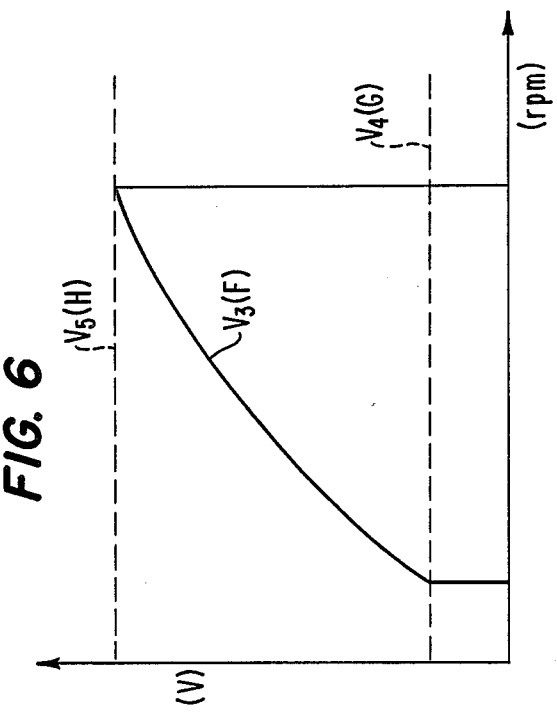
FIG. 6 is a graphical illustration of the relationship between the voltage signals at points F, G and H in FIG. 6.

As mentioned above, voltage $V_3$ at point F in FIG. 5 is continuously varying in accordance with the rotational speed of the compressor drive shaft as shown in FIG. 6. When voltage $V_3$ is lower than voltage value $V_5$, a logic LO signal is provided from the output terminal of comparator 24. When voltage $V_3$ is higher than voltage $V_5$, a logic HI signal is provided from the output terminal of comparator 24. Thus, when $V_3$ changes from $V_3 < V_5$ to $V_3 \geq V_5$, i.e., when the rotational speed of the compressor drive shaft is beyond the maximum rotational speed of the comprssor, multivibrator 25 provides a logic HI signal at its output. Due to the presence of invertor 26, however, a logic LO signal is provided to the input of AND gate 27 and thus there is a logic LO signal at the output of AND gates 27 and 28. Thus, switching transistor 18 is turned off and electromagnetic clutch also is turned off. After a predetermined time delay, a multivibrator 25 changes its logic state. Thus, a logic HI signal is provided to AND gate 27. Since the drive shaft of the compressor is at rest, comparator 23 provides a logic LO signal to AND gate 28 causing its output to be a logic LO. Thus, switching transistor 18 is not turned off. And as such, the compressor can be started by switch 16.

Furthermore, when voltage $V_3$ is lower than voltage $V_4$, a logic LO signal is provided from the output terminal of comparator 23 and switching transistor 18 is turned off. When voltage value is $V_5 > V_3 > V_4$, A logic HI signal is provided from the output terminal of AND circuit 28 switching transistor 18 on.

As mentioned above, the slip detecting device of the prsent invention is able to disengage the power transfer mechanism without detecting the rotational speed of the prime mover. Thus, the construction of the device is very simple in construction and operation. Moreover, the device of the invention can be applied to vehicle engines which do not use ignition coils, such as diesel engines wherein it is difficult to measure the rotational speed of the engine.

This invention has been described in detail in connection with the preferred embodiments, but these are examples only and the invention is not restricted thereto. It will be easily understood, by those skilled in the art that other variations and modifications can be easily made within the scope of this invention.

I claim:

1. In an apparatus driven by a prime mover, a device for providing a slippage signal when slippage is present in the power transfer mechanism used to connect siad apparatus to said prime mover, said device comprising:

speed detecting means for detecting the rotational speed of said apparatus and providing a speed signal corresponding to said speed;

reference signal means for providing a reference speed signal which corresponds to a speed less than the idling speed of said prime mover;

a comparator means for receiving said speed signal and said reference speed signal, wherein said comparator means provides said slippage signal when said speed signal is less than said reference speed signal, wherein said speed detecting means provides a plurality of voltage pulses, the period between each of said voltage pulses being dependent on the rotational speed of said apparatus; and waveform-shaping means coupled to said detecting means by coupling means for shaping the waveform of said voltage pulses to a standard width while maintaining the original period between said voltage pulses, wherein said waveform-shaping means comprises first and second logic NOR gates coupled in cascade, wherein a first input of said first NOR gate receives said voltage pulses and a second input of said first NOR gate is coupled to the output of said second NOR gate, the output of said first NOR gate being coupled to a first input of said second NOR gate by coupling means formed of a capacitor/resistor network and a second input of said second NOR gate being coupled to a logic zero.

2. The slip detecting device of claim 1 wherein said speed detecting means is a magnetic pick-up transducer which includes a plurality of permanent magnets, wherein each magnet causes said transducer to produce a voltage pulse when said prime mover rotates, the period between the voltage pulse caused by a first magnet and the voltage pulse caused by a second magnet being dependent on the rotational speed of said apparatus.

3. The slip detecting device of claim 1 wherein said coupling means is formed of a capacitor/resistor network.

4. The slip detecting device of claim 3 wherein said detecting means includes biasing means for biasing said voltage pulses to a substantially constant level.

5. The slip detecting device of claim 1 further comprising filtering means coupled to the output of said wave-shaping means for filtering said wave-shaped voltage pulses to provide an analogue voltage signal having a level dependent on the period between said wave-shaped voltage pulses, wherein the output of said filtering means is coupled to said comparator means, and said comparator means providing said slippage signals when said analogue voltage is below a predetermined voltage which corresponds to said reference speed signal, said slippage signal being used to control disengaging means for disengaging said apparatus from said prime mover when said slippage signal is present.

6. The slip detecting device of claim 5 wherein said comparator means is formed of first and second comparators and logic means, said first comparator providing an output signal when said analogue voltage is above a first predetermined level corresponding to said reference speed signal and said second comparator providing an output signal when said analogue voltage is above a second predetermined level corresponnding to a second reference speed signal, the output signals of said first and second comparators being provided to said logic means, said logic means providing said slippage signal.

7. The slip detecting device of claim 6 wherein when said first predetermined level is below the level of said analogue voltage and said second predetermined level is above the level of said analogue voltage, said logic means does not provide said slippage signal.

8. The slip detecting device of claim 1 wherein said power transfer mechanism includes an electromagnetic clutch for controlling the engagement of said apparatus with said prime mover, wherein said electromagnetic clutch is operated to disengage said apparatus from said prime mover when said slippage signal is present.

9. The slip detecting device of claim 8 further comprising logic means coupled to said comparator means for receiving said slippage signal and a clutch engagement signal, said logic means controlling said electromagnetic clutch to cause engagement of said apparatus with said prime mover only when said clutch engagement signal is present and said slippage signal is not present.

10. The slip detecting apparatus of claim 9 further comprising:
second reference signal means for providing a second reference speed signal which corresponds to the maximum speed of said apparatus; and
second comparator means for receiving said speed signal and said second reference speed signal, wherein said second comparator means provides an overspeed signal when said speed signal is greater than said second reference speed signal, said logic means controlling said electromagnetic clutch to cause engagement of said apparatus with said prime mover only when said clutch engagement signal is present and said overspeed signal and said slippage signals are not present.

11. In an apparatus driven by a prime mover, a device for providing a slippage signal when slippage is present in the power transfer mechanism used to connect said apparatus to said prime mover, said device comprising:
speed detecting means for detecting the rotational speed of said apparatus and providing a speed signal corresponding to said speed, said speed signal being formed of a plurality of voltage pulses;
first waveform-shaping means coupled to said speed detecting means for shaping said voltage pulses to have a rapid rise time and a rapid fall time, wherein said waveform-shaping means comprises first and second logic NOR gates coupled in cascade, wherein a first input of said first NOR gate receives said voltage pulses and a second input of said first NAND gate is coupled to the output of said second NOR gate, the output of said first NOR gate being coupled to a first input of said second NOR gate by coupling means formed of a capacitor/resistor network and a second input of said second NOR gate being coupled to a logic zero;
reference signal means for providing a reference speed signal which corresponds to a speed less than the idling speed of said prime mover and a comparator means coupled to said first waveform-shaping means for receiving said shaped voltage pulses and to said reference speed signal, wherein said comparator means provides said slippage signal when the speed represented by said shaped voltage pulses is less than the speed represented by said refernce speed signal.

12. The slip detecting device of claim 11 wherein said waveform-shaping means is a comparator.

13. The slip detecting device of claim 11 further comprising second waveform-shaping means coupled between said first waveform-shaping means and said comparator means for shaping said waveform of said shaped voltage pulses to standard width while maintaining the original period between said voltage pulses.

14. The slip detecting device of claim 11 further comprising filtering means coupled between said first waveform-shaping means and said comparator means for 15. In an apparatus driven by a prime mover, a device for providing a slippage signal when slippage is present in the power transfer mechanism used to connect said apparatus to said prime mover, said device comprising:
speed detecting means for detecting the rotational speed of said apparatus and providing a speed signal corresponding to said speed, said speed detecting means includes a plurality of permanent magnets, wherein each magnet causes said speed detecting means to produce a voltage pulse when said prime mover rotates, the period between the voltage pulse caused by a first magnet and the voltage caused by a second magnet being dependent on the rotational speed of said apparatus, wherein said detecting means provides a plurality of voltage pulses;
reference signal means for providing a reference speed signal which corresponds to a speed less than the idling speed of said prime mover;
waveform-shaping means coupled to saids detecting means for shaping the waveform of said voltage pulses to a standard width while maintaining the original period between said voltage pulses, said waveform-shaping means comprising first and second logic NOR gates coupled in cascade, wherein a first input of said first NOR gate receives said voltage pulses and a second input of said first NOR gate is coupled to the output of said second NOR gate, the output of said first NOR gate being coupled to a first input of said second NOR gate by coupling means formed of a capacitor/resistor network and a second input of said second NOR gate being coupled to a logic zero;

filtering means coupled to the output of said wave-shaping means for filtering said wave-shaped voltage pulses to provide an analogue voltage signal having a level dependent on the period between said wave-shaped voltage pulses; and comparator means for receiving said analogue signal and said reference speed signal, said comparator means providing said slippage signal when said analogue voltage is below a predetermined voltage which corresponds to said reference speed signal, said slippage signal being used to control disengaging means for disengaging said apparatus from said prime mover when said slippage signal is present.

* * * * *